United States Patent [19]
Ernst

[11] Patent Number: 6,098,789
[45] Date of Patent: Aug. 8, 2000

[54] CONVEYOR OPERATION CONTROL SYSTEM

[75] Inventor: Ronald L. Ernst, St. Clair County, Ill.

[73] Assignee: Alvey Systems, Inc., St. Louis, Mo.

[21] Appl. No.: 09/076,178

[22] Filed: May 11, 1998

[51] Int. Cl.[7] .................................................. B65G 15/00
[52] U.S. Cl. ........................................ 198/809; 198/460.3
[58] Field of Search ............................ 198/809, 810.01, 198/460.3, 460.1, 792, 802, 463.3

[56] References Cited

U.S. PATENT DOCUMENTS

| | | | |
|---|---|---|---|
| 3,322,259 | 5/1967 | Milazzo | 198/809 |
| 3,930,573 | 1/1976 | Wyman . | |
| 3,934,707 | 1/1976 | Bowman . | |
| 3,951,254 | 4/1976 | Juhrend | 198/809 |
| 4,149,626 | 4/1979 | Holt . | |
| 4,238,026 | 12/1980 | Mrugela et al. | 198/460 |
| 4,436,199 | 3/1984 | Babs et al. . | |
| 4,511,030 | 4/1985 | Lem . | |
| 4,925,005 | 5/1990 | Keller . | |
| 5,085,311 | 2/1992 | Garro . | |
| 5,358,097 | 10/1994 | Bakkila et al. | 198/781 |
| 5,437,360 | 8/1995 | Eberhard | 198/809 |
| 5,823,319 | 10/1998 | Resnick et al. | 198/781.06 |
| 5,906,267 | 5/1999 | Heit et al. | 198/781.05 |

FOREIGN PATENT DOCUMENTS

| | | | |
|---|---|---|---|
| 0145018 | 7/1986 | Japan | 198/809 |

*Primary Examiner*—Christopher P. Ellis
*Assistant Examiner*—Khoi H. Tran
*Attorney, Agent, or Firm*—Polster, Lieder, Woodruff & Lucchesi, L.C.

[57] ABSTRACT

A package conveyor operating control system comprised of a continuous conveying belt supported on separate plates, air pressure responsive pads supporting the plates to effect lifting and lowering of the plates, photocells associated with each plate to detect the presence of accumulated packages, groups of air pressure flow valves to control the lifting and lowering of the plate to permit accumulation of the packages when a leading photocell signals accumulated packages to initiate the lowering of the trailing support plate after a time delay and when both a leading and trailing photocell signals accumulation of packages to initiate the lowering of the trailing support plates after a shortened time delay to avoid impact damage to the accumulated packages.

11 Claims, 11 Drawing Sheets

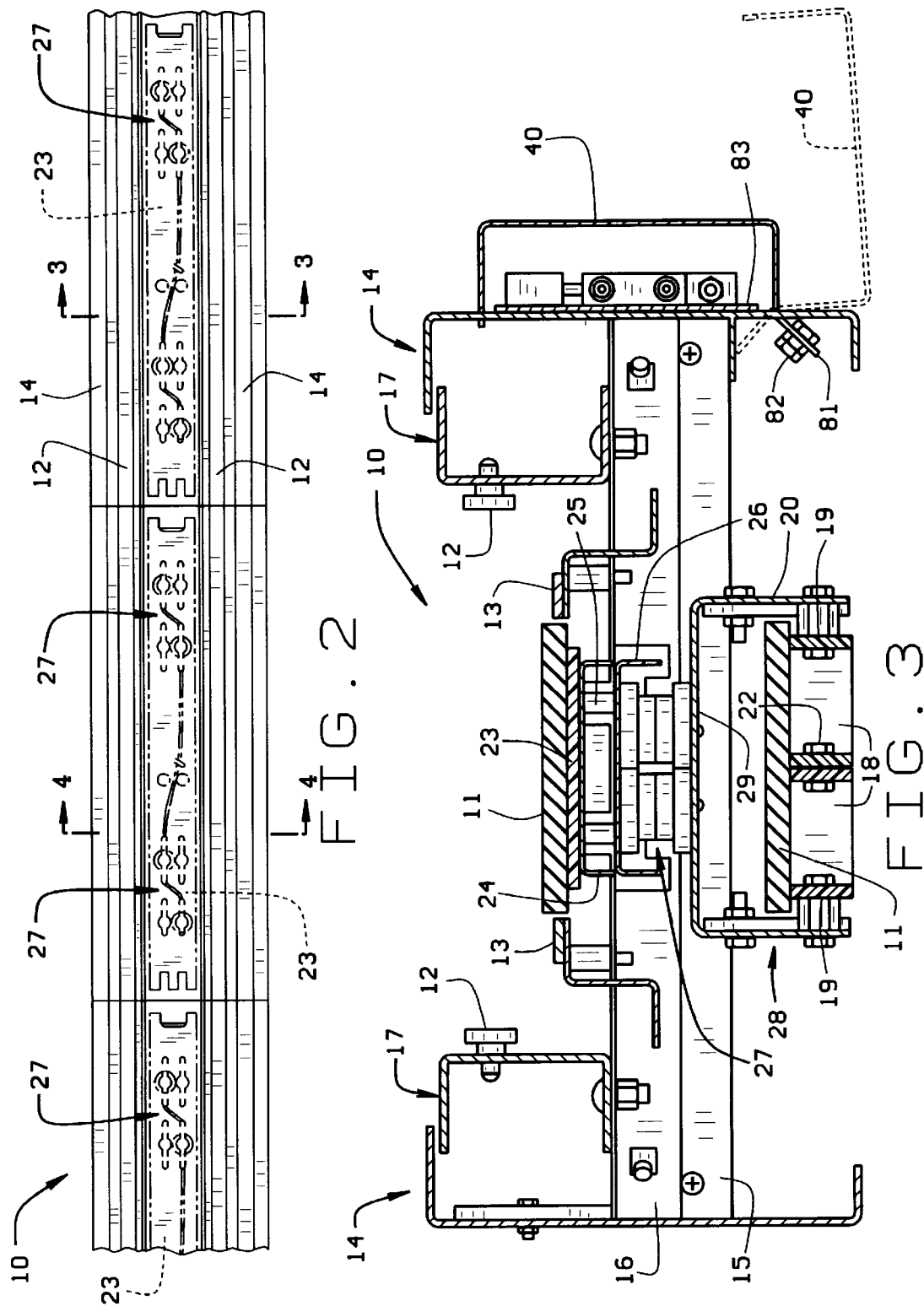

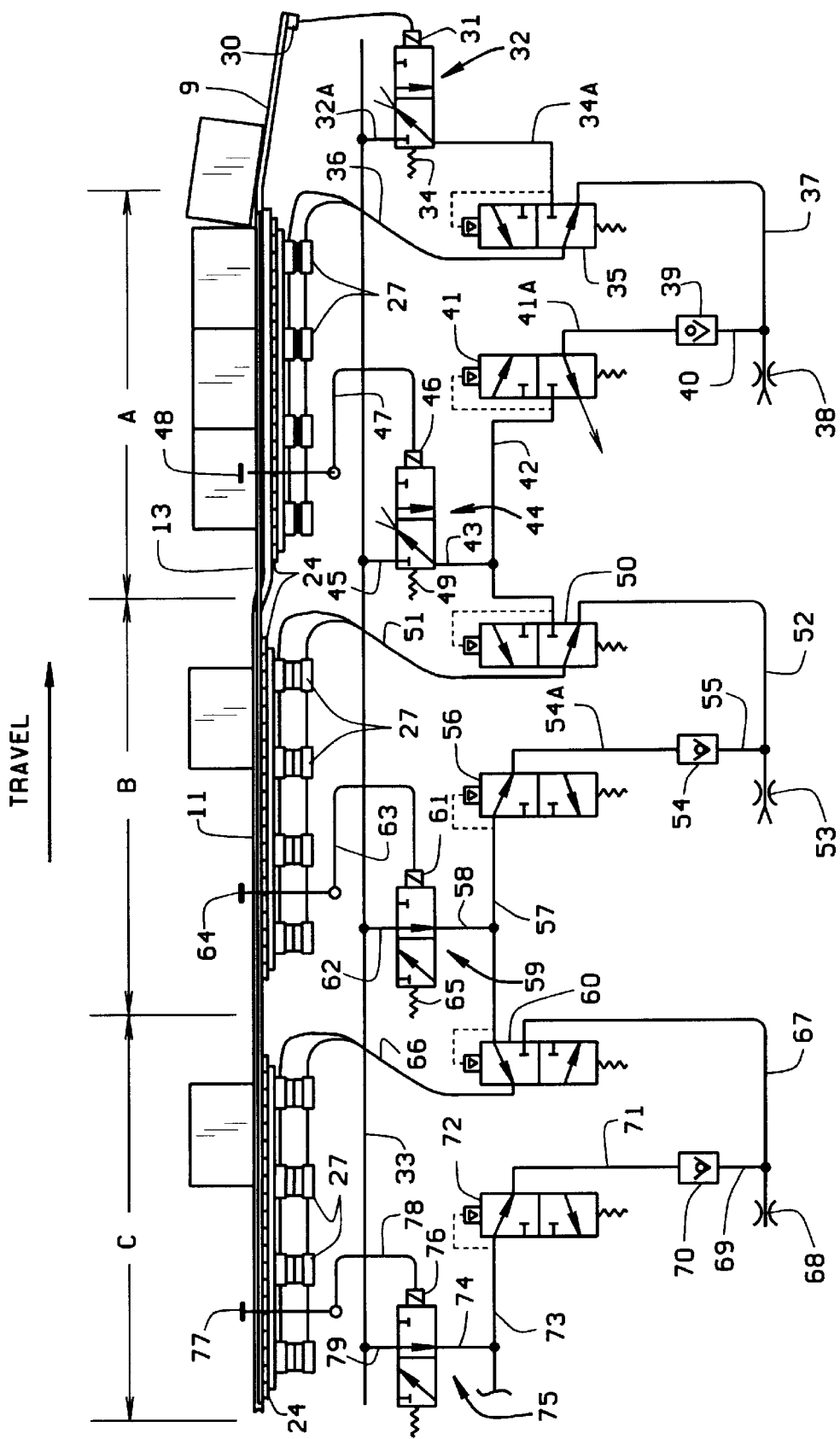

CONVEYOR OPERATION CONTROL SYSTEM

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

This invention is directed to a control system for detecting the presence of packages that may accumulate on a rollerless conveyor that provides long accumulation zones in the conveyor without sacrificing accumulation density so as to simplify accumulation control zones for sensing packages that may be moved along the conveyor.

The prior art of accumulating packages on a conveyor wherein the package is moved along a plurality of rollers by a chain that is elevated to support the package for movement relative to frame members has means to support the package in a stationary position when not lifted by the chain for transportation to an outlet. Such a conveyor is disclosed in Wyman U.S. Pat. No. 3,930,5730 of Jan. 6, 1976.

A variation in the prior art is disclosed in Bowman U.S. Pat. No. 3,934,707 of Jan. 27, 1976 which employs a continuously drawn belt with ways alongside the belt which are movable vertically to vary the relative vertical position between an accumulation position wherein the support surface of the ways is above the conveyor belt causing package accumulation and a package drive position wherein the support surface of the way is below the conveyor belt causing package movement.

The prior art includes a conveyor system of the character in Holt U.S. Pat. No. 4,149,626 of Apr. 17, 1979 in which spaced conveyor surfaces of multiple rollers are occupied by a flat link chain which is vertically movable relative to the spaced roller surfaces at selective portions to move packages.

Furthermore, the prior art Garro U.S. Pat. No. 5,085,311 of Feb. 4, 1992 has disclosed a belt or chain with wear surfaces along both sides of the belt or chain for conveying packages, and apparatus for displacing the belt or chain or the wear surface relative to each other to provide an in-line accumulator having a zero backline pressure.

BRIEF SUMMARY OF THE INVENTION

To overcome the prior art deficiencies it is an important object of this invention in rollerless accumulation conveyors to have a control scheme that enables the use of long accumulation zones without sacrificing accumulation density to reduce the quantity or number of zones required, thereby resulting in fewer elements in a control system.

Another object is to employ a control system that responds to the accumulation of packages at a discharge zone to supervise the performance of the system by delaying removal of conveyor drive contact to obtain a high package density in such zone, and also initiate final conveyor drive removal to prevent package damage once maximum density is obtained.

A further object of the invention is to provide photocell means to exhaust the pressure medium in a control system so as to maximize package accumulation density when the package charge rate is low, and avoiding excessive package line pressure when the charge rate is high.

Another object of the invention is to provide the accumulation conveyor with a control system having a location in a frame to provide a convenient working surface to perform adjustments when the protective cover for the control system is manually opened to allow for service access.

BRIEF DESCRIPTION OF THE SEVERAL VIEWS OF THE DRAWINGS

In the drawings.

FIG. 2 is a fragmentary longitudinal plan view of the conveyor structure for moving packages seen in FIG. 1;

FIG. 3 is an enlarged cross section view of the conveyor structure with the package moving belt seen at line 3—3 in FIG. 2;

FIG. 4 is an enlarged cross section view of the conveyor structure when the conveyor belt is lowered as seen at line 4—4 in FIG. 2;

FIG. 5 is a fragmentary plan view of the support for the returning conveyor travel seen at line 5—5 in FIG. 4;

FIG. 6B is condition of the schematic control system when the conveyor belt lift pads are fully exhausted of air in zone A and the control system for the belt in zone B is rendered subject to the exhaust of the initial supply of air affecting the raised position of the conveyor belt in zone B;

Corresponding reference numerals will be used throughout the several figures of the drawings.

DETAILED DESCRIPTION OF THE INVENTION

The following detailed description illustrates the invention by way of example and not by way of limitation. This will clearly enable one skilled in the art to make and use the invention to advantage in its present best mode.

Figure 1:
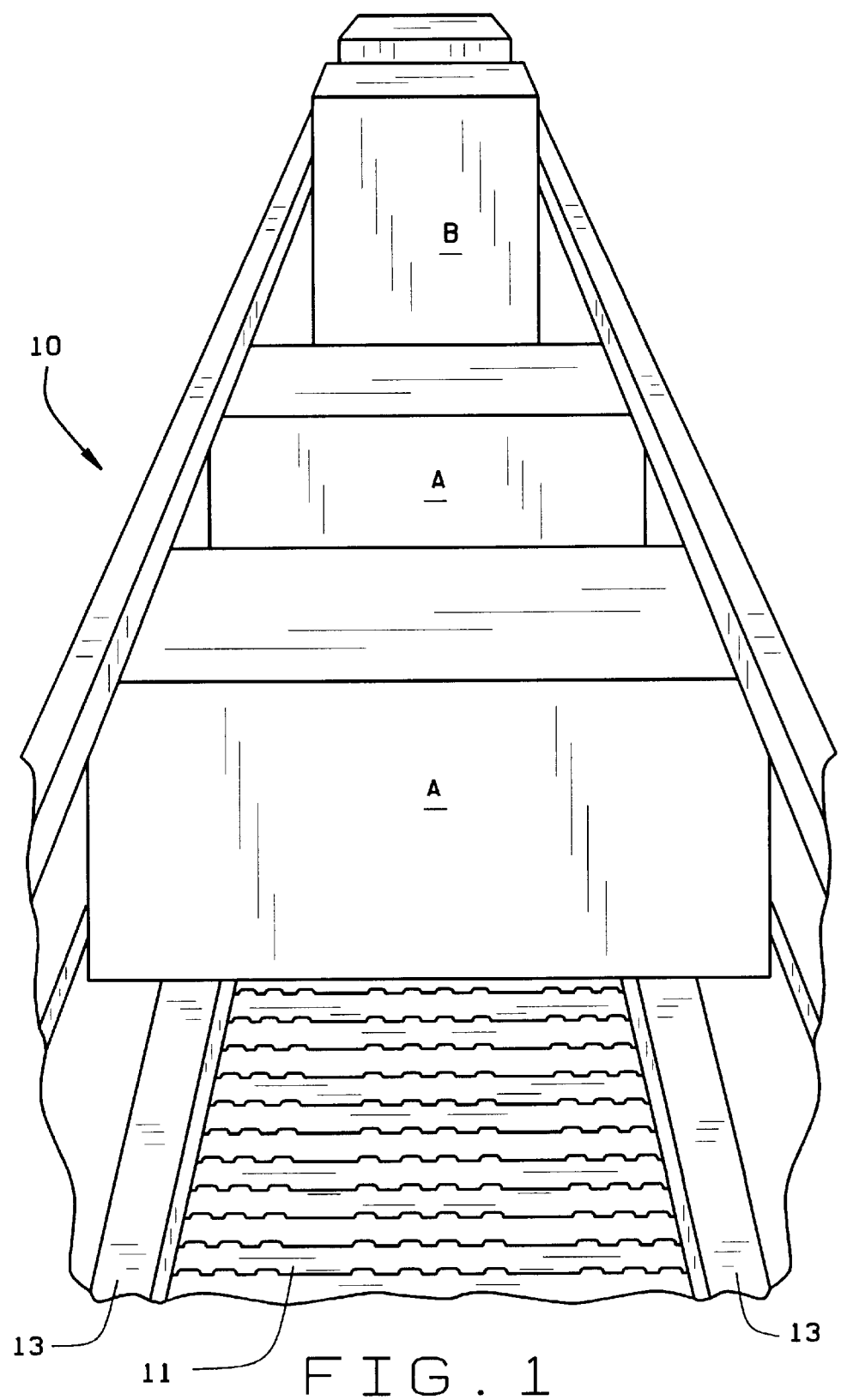
FIG. 1 is a schematic perspective view of a conveyor for moving different sizes of packages to be detailed hereinafter.
Figures 4, 5:
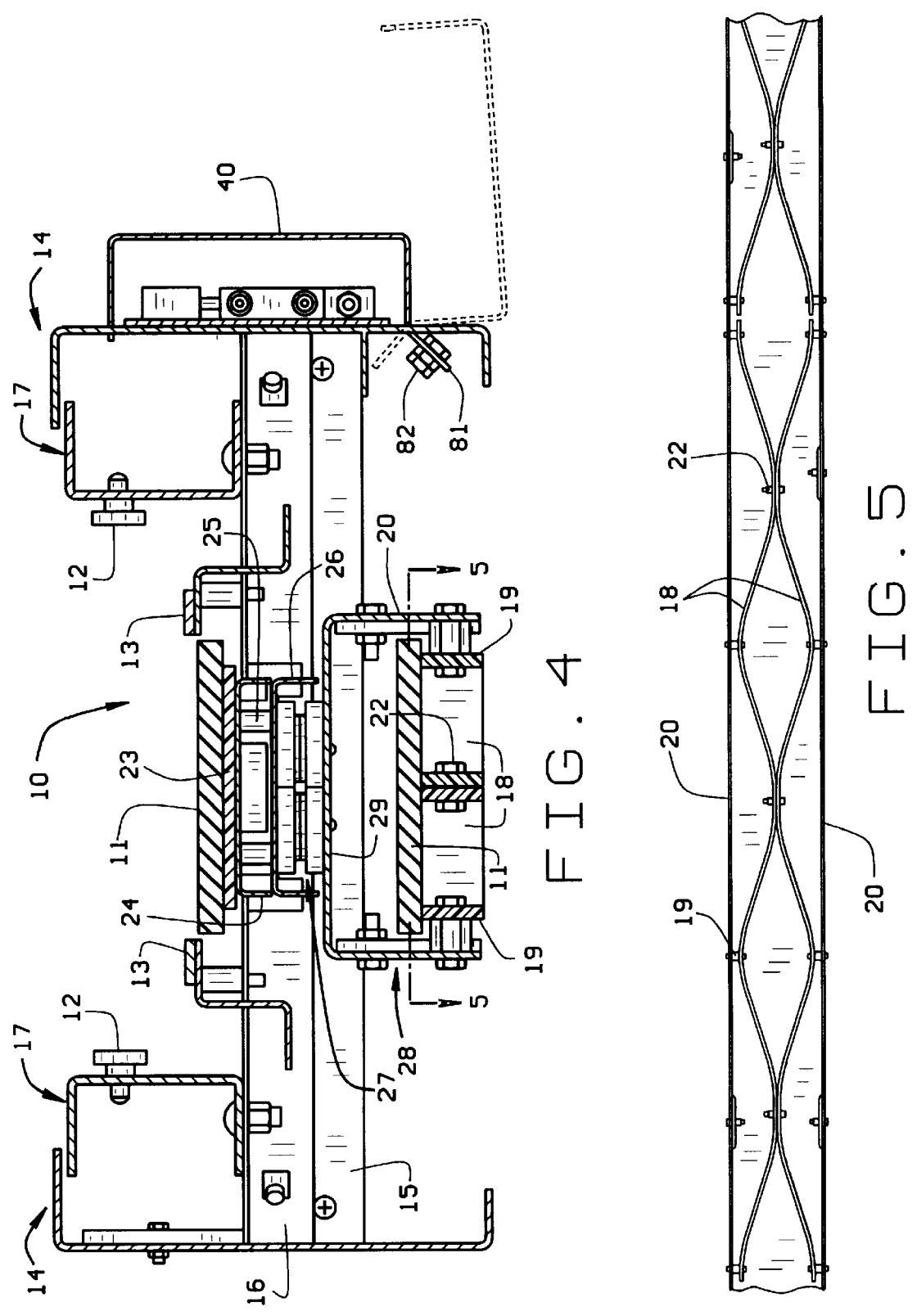

In the view of FIGS. 1, 2 and 3, the conveyor 10 is seen to move different sizes of packages A or B on the surface of the rollerless belt 11 in FIG. 1 centered by side guides 12 seen in FIGS. 3 and 4. When the belt 11 is raised, as in FIG. 3, the package is lifted above stationary skid strips 13. The section view of FIG. 3 shows the conveyor sides 14 connected by a transverse spacer 15 of which sides 14 are supported and in which the upper section 16 carries the guide supports 17 which carry the guides 12. In addition, the spacer section 16 also carries the skid strips 13 at each side of the moving rollerless conveyor belt 11. The return pass of that belt 11 runs over a wear control pair of strips 18 which are directed in a wave form as illustrated in FIG. 5 for the return pass of belt 11. The strips 18 alternately connect at 19 to the sides 20 of a longitudinal channel structure and connect to each other by bolts 22, all as indicated in FIG. 5.

Further with respect to FIG. 3, the rollerless conveyor belt 11 is supported to move over the top of a support plate 23 carried by channel 24. That top plate 23 is formed of a plastic material which provides a smooth low friction surface for the belt 11. The underside of the channel 24 is supported on a system of spacers 25 in contact with a second channel 26. That channel 26 rests on air expansion pad elements 27 which have upper and lower parts aligned over a down-turned deep channel 28 providing side walls 20 and a closed top surface 29 adapted to support the air expansion pad elements. The parts of pads 27 form air expansion cellular elements to provide the desired amount of vertical displacement of the conveyor belt between its recessed or lowered position and its raised or elevated position. In the position seen in FIG. 3, the belt is in its elevated position while in FIG. 4 the belt is in the lowered position due to exhausting of air from the pads 27.

Figure 6:
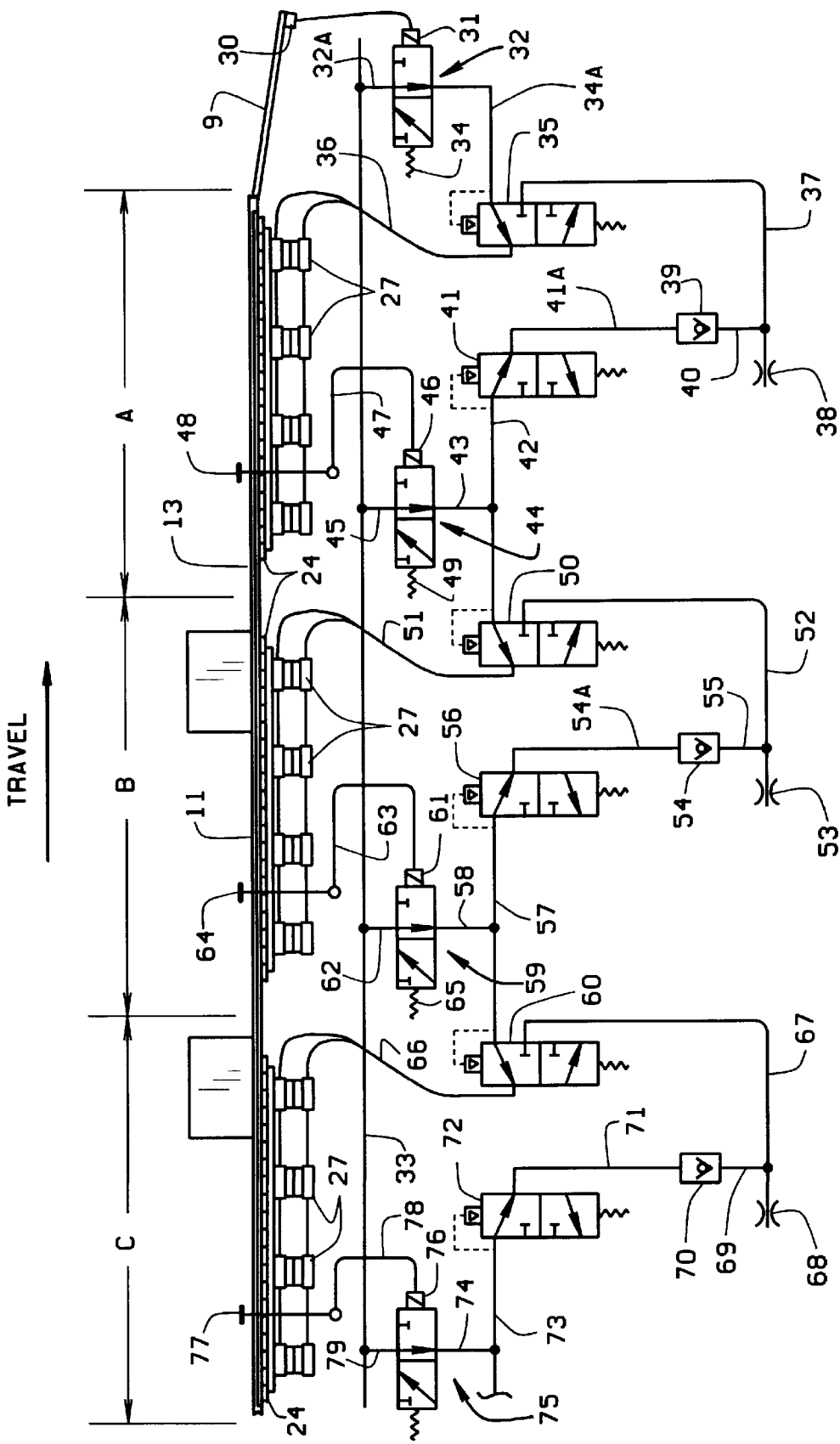
FIG. 6 is a schematic assembly of a control system associated with the conveyor seen in FIG. 2 with a package conveyor elevated to move packages normally along the conveyor without encountering accumulation of product.

In the conveyor arrangement of FIG. 6 there are shown three zones of the conveyor which are related in sequence so that if a leading conveyor zone indicates that packages are accumulating and are not being downloaded from the conveyor, the next trailing conveyor zone can be prepared to slow down on package transportation or stop and accumulate packages until the package accumulation in the leading conveyor zone is conditioned to resume transportation on the moving belt or for delivery off the conveyor belt 11.

In the present conveyor scheme it is to be understood that each zone in the conveyor 10 has a system of controls that are duplicated from zone to zone so that a pressure fluid valve in a leading transportation zone can signal the next trailing zone of the conveyor that packages are accumulating in the leading zone. The pressure fluid may be either a liquid or air as the pressurizing medium. What is being described in the following text will relate to the controlling device in each zone by terms that become duplicative so as to explain the control scheme being employed using air pressure.

For a conveyor system that has no problem of arresting or accumulating packages on a belt which can be elevated or lifted and lowered, there is shown in FIG. 6 a package discharge surface 9 having a sensor 30 to supply power to the solenoid 31 in a first valve 32 arranged to allow air from a primary air line 33 to flow from line 32A through line 34A to a second valve 35 which applies pressure through an internal passage seen in dotted line to hold the second valve 35 so air is able to flow into line 36 to expand the pads 27 to elevate the support plate for that zone A of the conveyor belt 11. So long as the packages run off surface 9 to maintain power from unit 30 to the solenoid 31 of valve 32, air from the supply line 32A will pass through the valve 32 to the line 34A and to the second valve 35 and to line 36 to elevate pads 27 for holding the belt 11 in FIG. 6 elevated. That second valve 35 is connected by line 37 to an orifice 38 and by line 40 to a check valve 39. That check valve 39 is held closed by pressure in line 41A from a third valve 41. That third valve 41 is influenced by the position in FIG. 6 by pressure in line 42 and 43 from a first valve 44 which is connected by line 45 to the pressure line 33. That first valve 44 is held in the position shown by current in lead 47 from a photocell 48 in zone A which has the belt 11 elevated to convey packages.

Continuing with FIG. 6, the first photocell 48 which is not blocked and is energizing solenoid 46 to position first valve 44 to supply air in lines 43 and 42 to a second valve 50 which is positioned by internal pressure to hold that second valve 50 to supply air into line 51 for pads 27 in zone B which holds the conveyor belt 11 elevated so that packages are free to be moved. The second valve 50 is connected by line 52 to an orifice 53 and to a check valve 54 by line 55. Check valve 54 is held closed by pressure supplied from a third valve 56 which is set in the position of FIG. 6 by pressure in line 57 from the line 58 connected to the first valve 59 which is under the control of a photocell 64 which is not blocked in zone B. Air from the main line 33 can pass by connection 62 through first valve 59 because photocell 64 is energizing solenoid 61 to hold that first valve 59 in the position shown in FIG. 6.

Continuing with FIG. 6, the second photocell 64 which is not blocked and is energizing solenoid 61 to position first valve 59 to supply air in lines 58 and 57 to a second valve 60 which is positioned by internal pressure in position to hold that second valve 60 to supply air into line 66 for pads 27 in zone C which holds the conveyor belt 11 elevated so that packages are free to be moved. The second valve 60 is connected by line 67 to an orifice 68 and to a check valve 70 by line 69. Check valve 70 is held closed by pressure supplied from a third valve 72 which is set in the position of FIG. 6 by pressure in line 73 from the line 74 connected to the first valve 75 which is under the control of a photocell 77 which is not blocked in zone C. Air from the main line 33 can pass by connection 79 through first valve 75 because photocell 77 is energizing solenoid 76 to hold that first valve 75 in the position shown in FIG. 6. Accordingly FIG. 6 shows free transportation of packages along its length of zone A, B and C.

It has been explained in FIG. 6 that there are three zones A, B and C, and each zone is associated with repetitive controls. For example, zone A is in the leading position and zone B is trailing, followed by zone C which trails zone B. Zone A discharges packages onto surface 9, but when surface 9 is blocked or has become nonfunctional, sensor 30 removes power from solenoid 31, allowing return spring 34 to shift first valve 32 as in FIG. 6A. When that happens, air in line 34A is exhausted through valve 32, shifting quick exhaust valve 35 to gradually lower zone A pads 27 by reason of air in pads 27 being slowly exhausted through line 36 to line 37 and out orifice 38. The fluid in line 40 is blocked at closed check valve 39 since the pressure in line 41A is higher than that of the air exhausting from line 37.

Figure 6A:
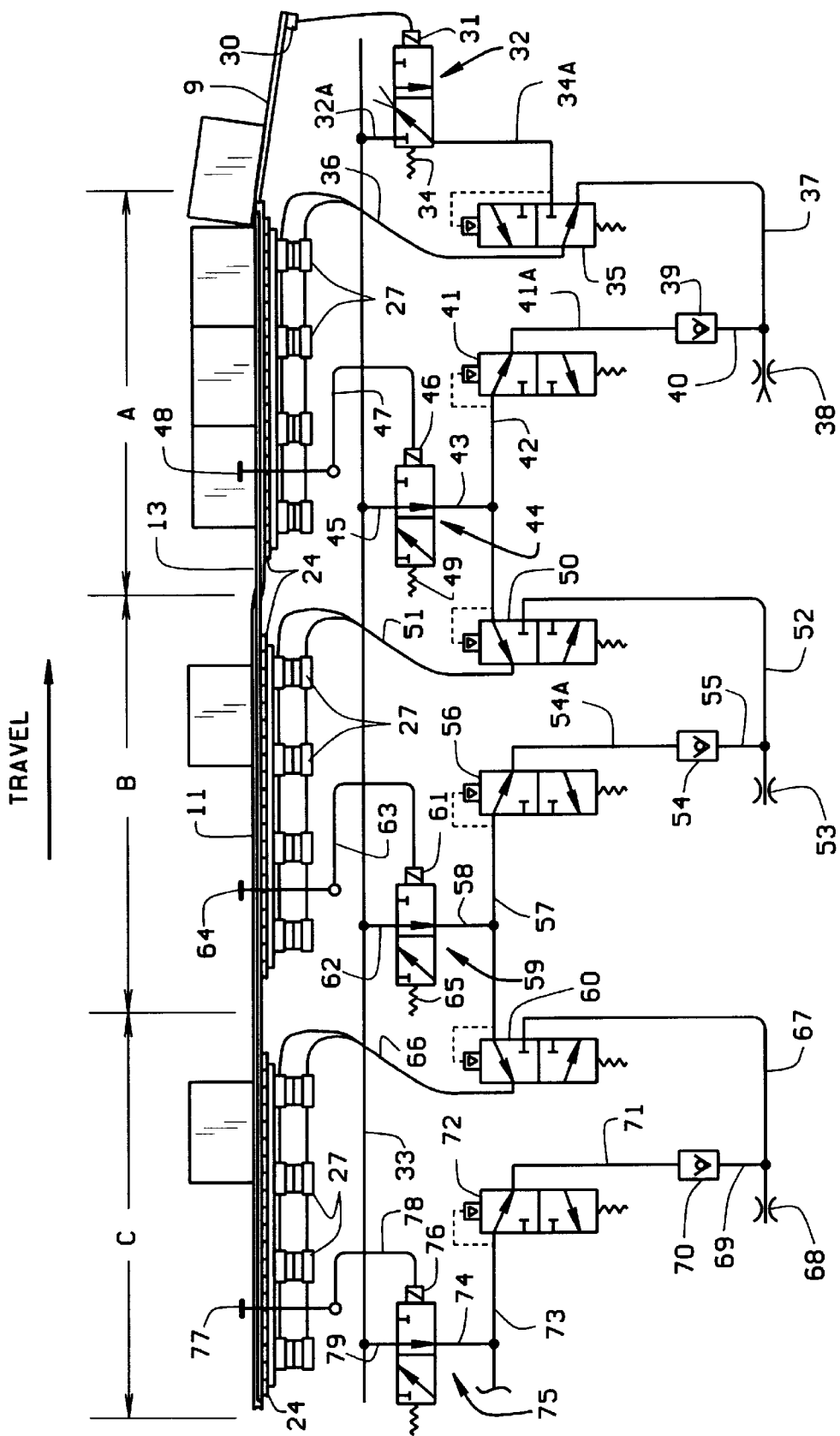
FIG. 6A is the condition of the schematic control system when the conveyor belt in zone A is being lowered due to accumulation of packages.

With surface 9 no longer accepting product, packages will begin to accumulate in zone A as in FIG. 6A. Since the air in pads 27 in zone A is being exhausted slowly, packages in transit on the conveyor are able to continue to fill zone A. The size of orifice 38 can be selected based on the rate at which packages are typically being fed to the conveyor, to result in the zone accumulating full of packages before enough air exhausts from pads 27 to set packages onto skids 13.

Photocell 48 has a time delay function built in which allows packages passing by in a transportation mode to be ignored. However, when packages accumulate in zone A, photocell 48 will become blocked as in FIG. 6A. After being blocked for a preset time interval, power is removed from solenoid 46 so that valve 44 in FIG. 6B releases pressure from lines 43 and 42, which causes valve 41 to exhaust air in line 41A, thereby releasing check valve 39. Any air remaining in pads 27 in zone A is able to quickly exhaust from line 40 through check valve 39 and out valve 41. Thus the pads 27 will allow the belt 11 in zone A to lower quickly, thus avoiding an excessive build-up of package line pressure as additional packages accumulate. The uniqueness of this control scheme is that it provides a means to maximize accumulation density when the package flow rate is low, but avoids excessive package line pressure when the charge rate is high. The purpose of allowing air to escape at the orifice is to gradually lower the packages from belt 11 to skids 13 regardless of packages blocking photocell 48.

Figure 6C:
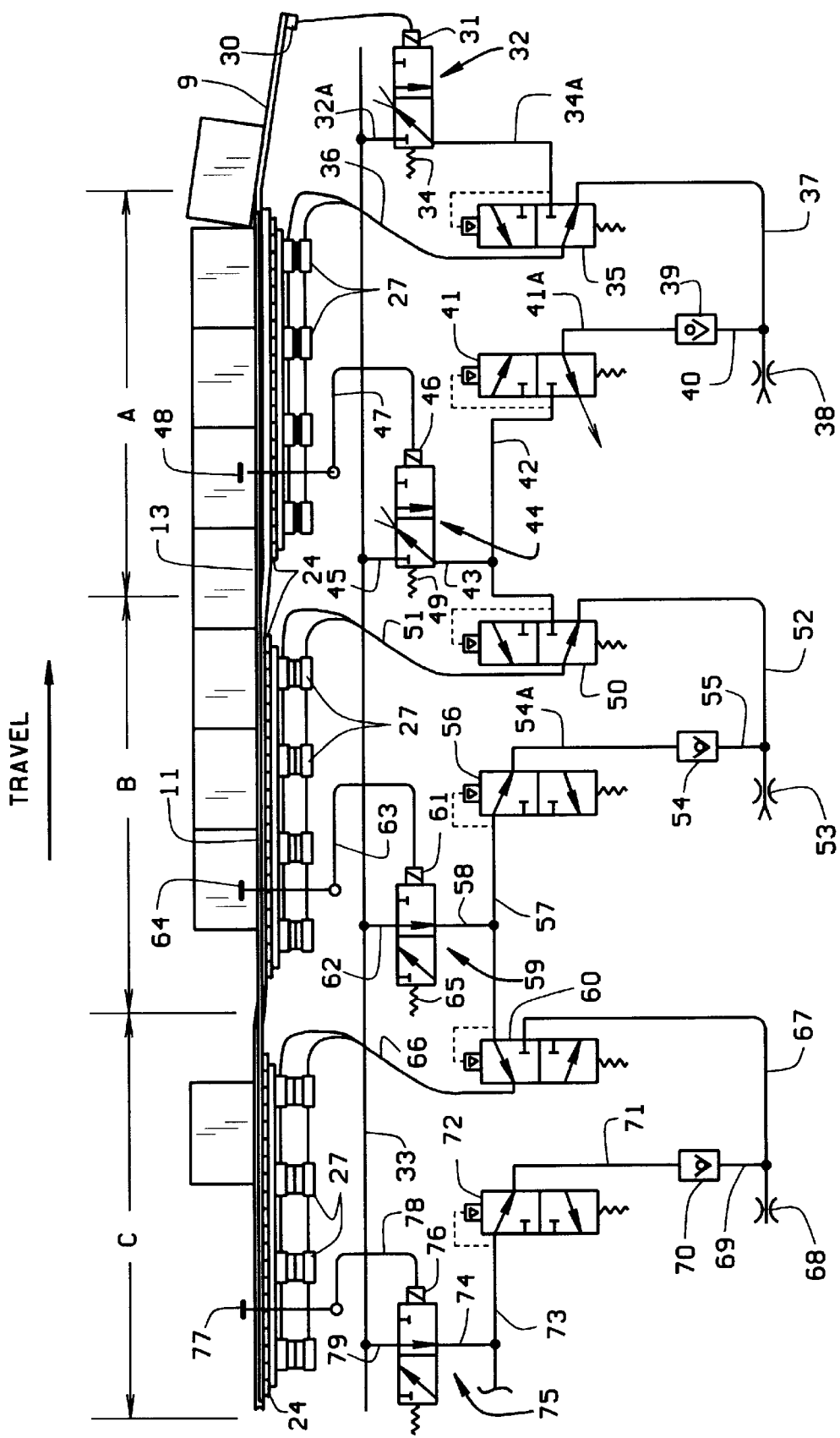
FIG. 6C is the condition of schematic control system to allow packages to begin accumulating in zone B while zone B is being lowered.
Figure 6D:
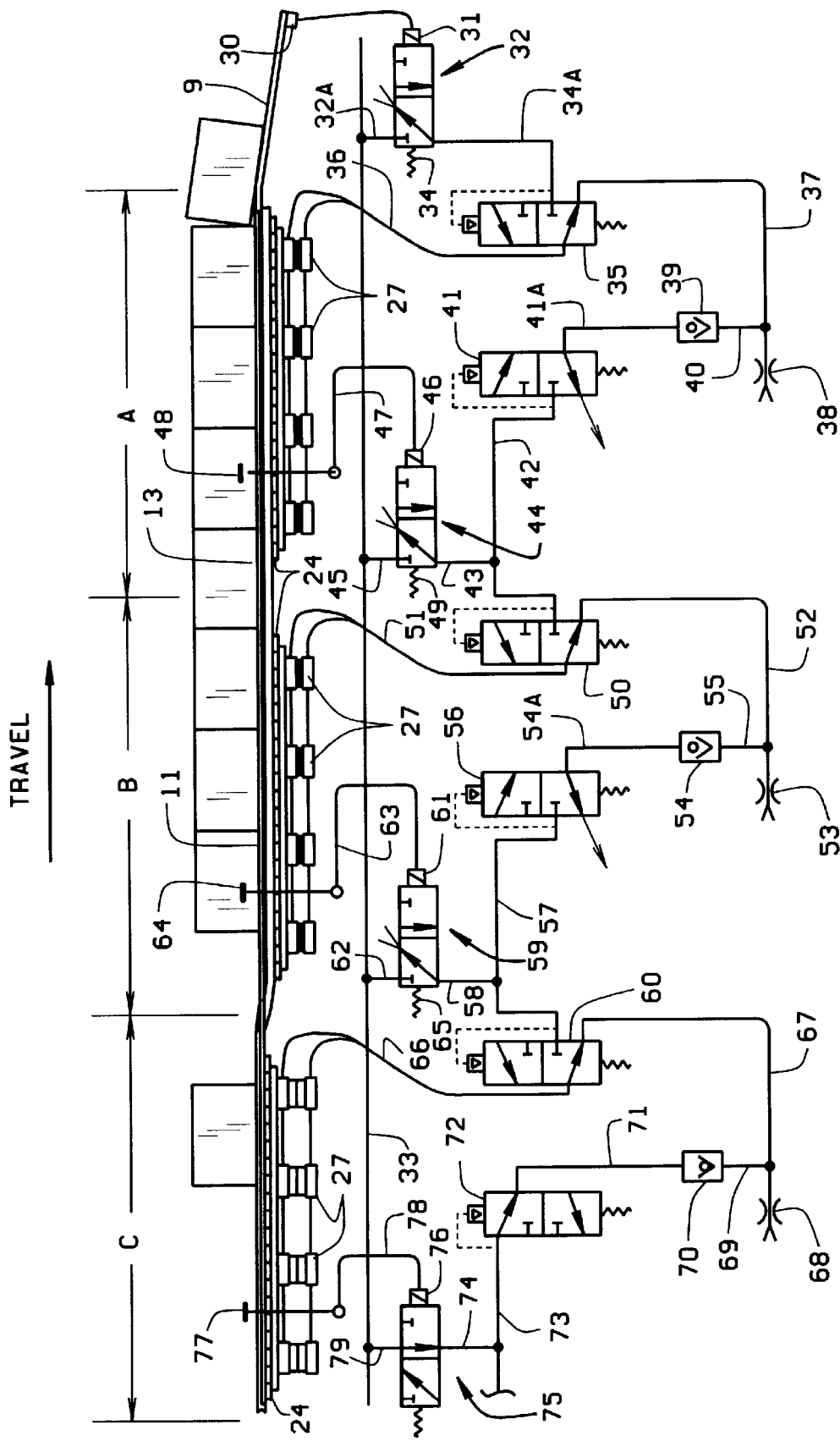
FIG. 6D is condition of the schematic control system when the pads supporting the conveyor belt are fully exhausted of air in zones A and B and air for belt in zone C is exhausting.

The exhausting of air from lines 42 and 43 as previously described will also cause the second valve 50 to begin slowly exhausting fluid from pads 27 in zone B through line 52 and orifice 53, but not through check valve 54 which is held closed at this time. Now zone B will accumulate packages until photocell 64 becomes blocked, as in FIG. 6C but has not timed out. After a time delay, the power to solenoid 61 will be cut off and valve 59 will shift to position in FIG. 6D. That shift opens line 57 to exhaust air to atmosphere and shifts valve 56 which allows the check valve 54 to open line 54A and the pads 27 in zone B will lower rapidly. Concurrently the valve 60 will open to begin exhausting the pads 27 in zone C as seen in FIG. 6D. That action of valve 60 will allow the air in pads 27 of zone C to slowly exhaust air at orifice 68, as check valve 70 is held closed by pressure from valve 72.

Figure 6E:
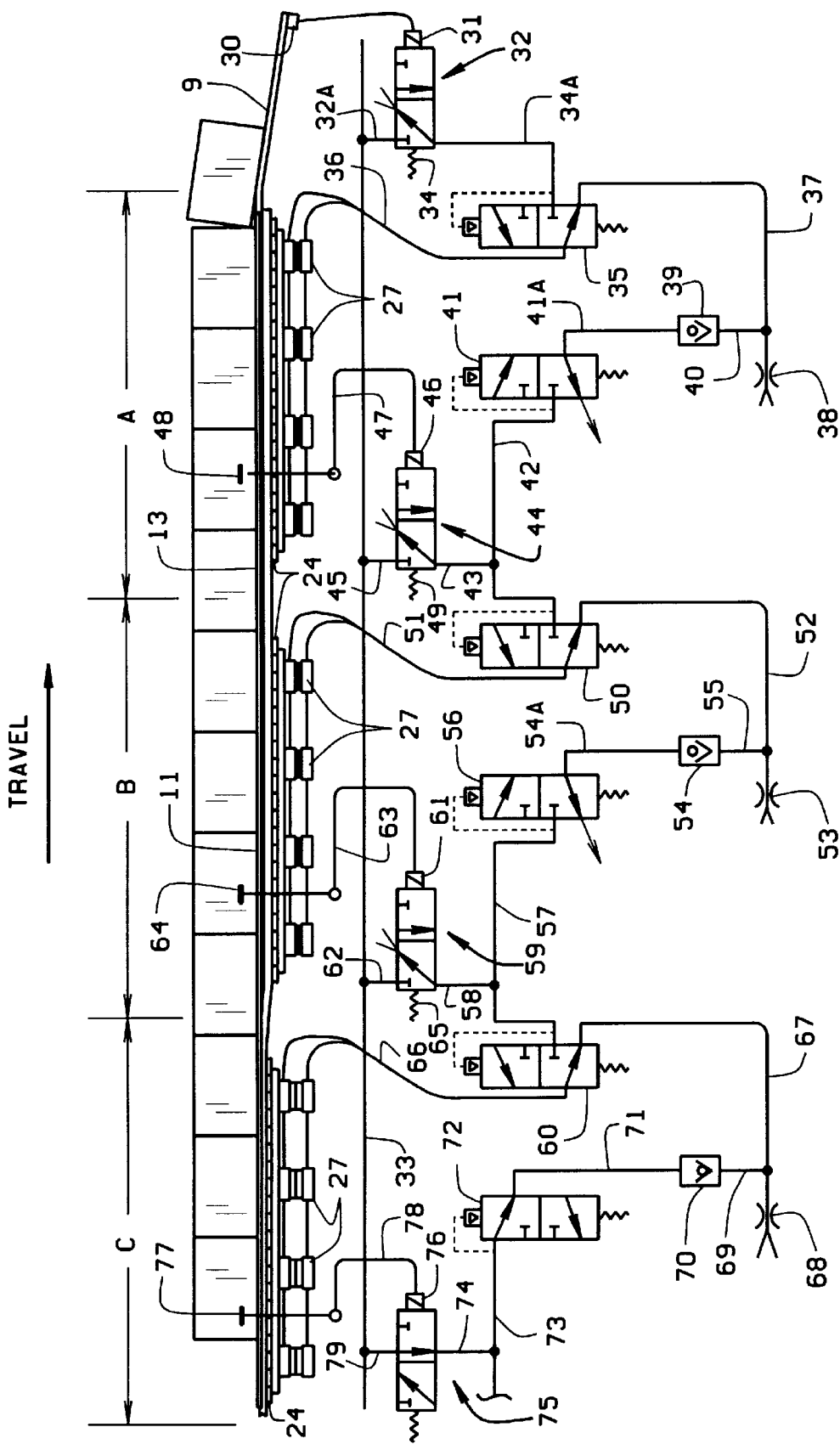
FIG. 6E is the condition of the schematic control system to allow packages to begin accumulating in zone C while zone C is being lowered.
Figure 7:
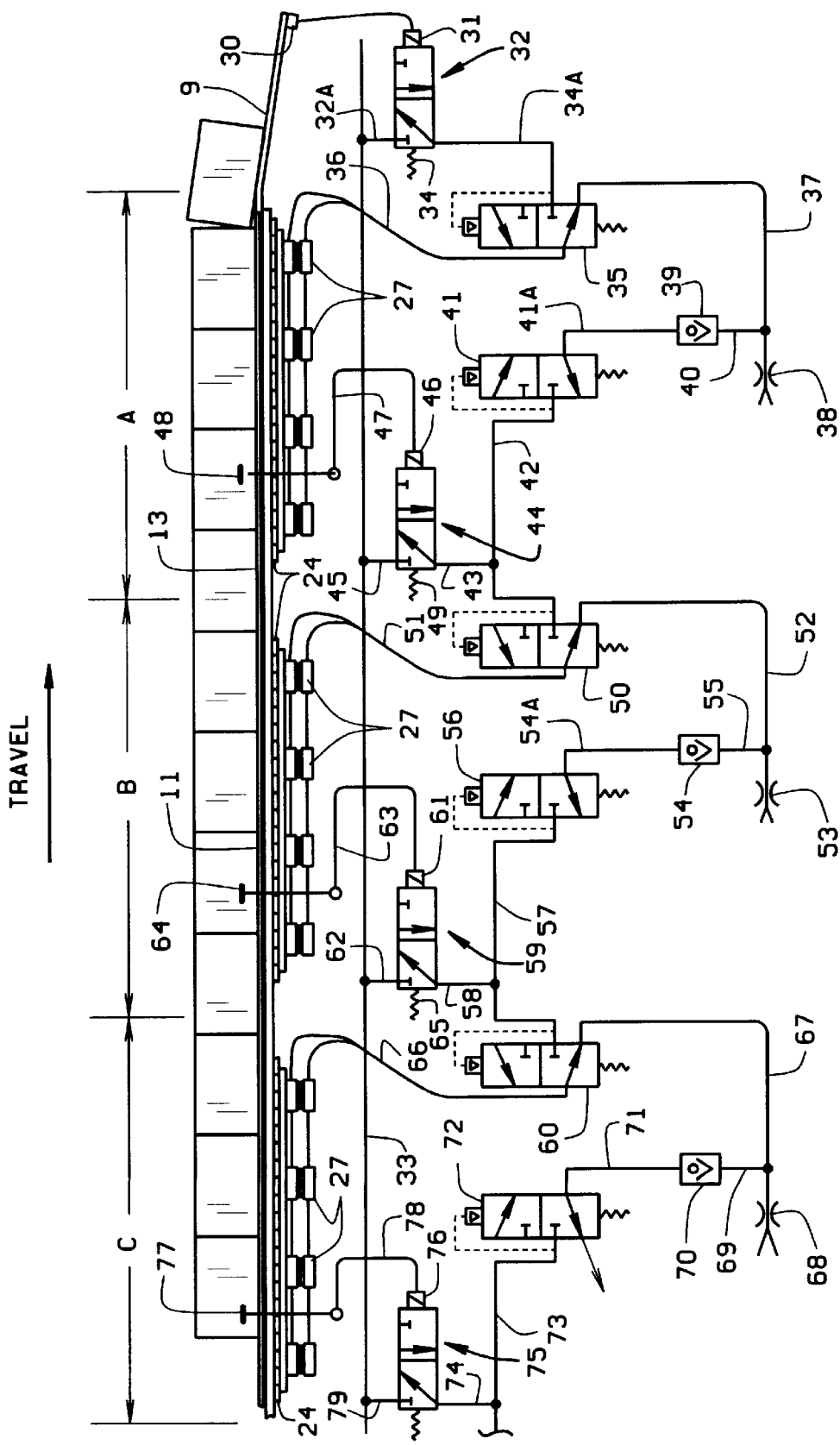
FIG. 7 is a schematic assembly view of the control system to further illustrate the multiple alignment of a plurality of conveyor zones on which accumulation of packages has taken place.

Zone C will accumulate packages until the photocell 77 is blocked in FIG. 6E. After the time delay of photocell 77 has time out as in FIG. 7 power in line 78 to solenoid valve 76 is cut off. That last event will be followed by the view of FIG. 7 which allow valve 72 to open check valve 70 which allows the pads 27 in zone C to exhaust air rapidly to lower the belt.

The events described taking place in zone A, B and C will continue down the conveyor 10 as long as the leading zone A of the conveyor continues to be blocked by accumulation of packages. When the surface 9 again allows passage of packages the control system will allow the zones A, B and C to progressively move packages until all zones transport packages.

Figure 8:
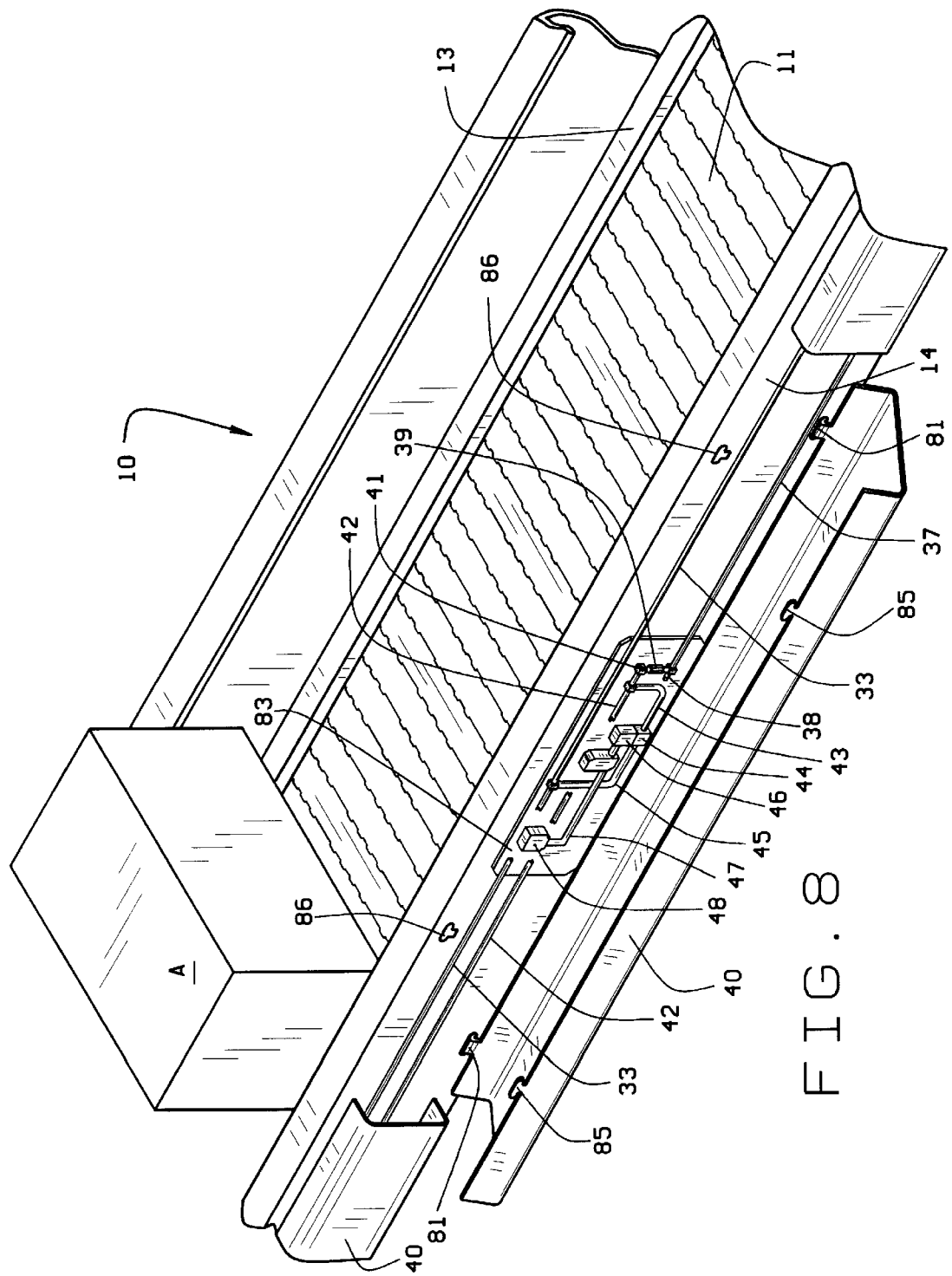
FIG. 8 is an enlarged and fragmentary schematic view of a conveyor provided with a service shelf carried at the side of the structure of the conveyor assembly so the controls employed in FIG. 4 can be accessed to effect adjustment or service of the controls schematically seen in FIGS. 6 and 7.

The view of FIG. 8 illustrates a further object of the disclosure which has to do with the provision for enabling quick service to the control system when needed, all without the need to dismantle any of the structure carrying the conveyor belt and the supporting apparatus associated with it. The view of FIG. 8 is related with FIG. 3 where a side protective cover 40 has been opened for exposing the control assembly which is typical of any one of the zones shown in FIG. 6. The controls seen in FIG. 6, are duplicated for each assembly, are carried on a plate 83 attached to the side wall 14 of the conveyor frame. The photocell 48 (zone A) is seen on the plate 83 having its connection 47 to the solenoid 46. The principle air conduit 33 as well as the rest of the control assembly is depicted in a general way so it can be protected by the cover 40. The cover is attached to the side 14 by a pair of hinge leafs 81 (FIG. 3) spaced along the bottom edge of the cover 40. Each hinge leaf 81 is secured by removable bolts 82. A set of retainer elements 85 are T shaped tabs adapted to be fitted into T shaped opening 86. It is to be understood that the cover 40 can be retained by inserting the T shaped tabs 85 into the openings 86 and allowing the cover 40 to drop down so the tabs and opening gain a mutual engagement. Opening of the cover 40 requires a lifting movement to unlock the tabs 85 so the cover can be hinged out to present a work surface.

The package conveying system set forth in the preceding description includes a package conveying belt divided into zones in alignment, thus providing a substantially continuous path of travel through said alignment of individual supports having air pads subject to a supply of air under pressure for selectively elevating and lowering the conveying belt. A control system is operative on said conveyor belt air pads to detect movement of packages in the continuous path of travel such that should a leading zone of the belt conveyor support non-moving packages the control system has the ability to signal a trailing zone of the belt to change its positions to lower that position from a package support elevation to a belt lowering position and provide stationary means to assume the support of package so the conveyor belt movement is not interfered with and packages are supported so as to avoid trailing packages impacting on the packages in a leading zone of the conveying belt.

The photocells in the view of FIG. 6 are of a character that possesses a timing circuit to respond if a package holds a position to block the photocell for a time interval. Any of the convenient photocells with a solid state timing circuit can be used, such as Banner Engineering Corp. Econo-Beam Series can be selected.

It is also disclosed in the foregoing specification that the assembly of valves operative connected with conveyor belt offers an opportunity to simplify the control system.

What is claimed is:

1. The combination in a package conveying system which comprises:

a package carrying conveyor belt providing a continuous path for the movement of packages;

conveyor belt supporting plates underlying said conveyor belt, said plates being aligned with said continuous path of said conveyor belt and being disconnected to define independent zones of support for said conveyor belt;

air responsive pads engaged under each support plate arranged in separate groups;

first air flow valves operatively associated with each of said separate groups of air responsive pads;

second air flow valves operatively connected between said first valve and said separate groups of pads;

a source of air under pressure connected to each first air flow valve in position to supply air to said second valves connected to said separate groups of air responsive pads;

package movement detecting means on said conveyor belt arranged in said zones defined by said support plates, said detecting means responding to package travel on said conveyor belt and being responsive to package accumulation interruption; and circuit means connected between each of said detecting means and certain of said first air flow valve whereby on package accumulation interruption in a leading zone on said belt, said packages detecting means in said leading zone operates to exhaust air from the air responsive pads in said trailing zone, said trailing zone responding to package accumulation to withdraw support of said conveyor belt in said trailing zone for initiating accumulating packages in said trailing zone to avoid impacting packages in said leading zone.

2. The combination set forth in claim 1 wherein said package detecting means in said loading zone operates to exhaust the air from said group of air responsive pads in said trailing zone to allow said belt supporting plate to lower said belt in said trailing zone.

3. The combination set forth in claim 1 wherein said conveyor belt supporting plates have a smooth frictionless surface presented to said conveyor belt.

4. The combination in a package conveying system which comprises:

a package carrying conveyor belt providing a continuous path for the movement of packages;

a series of separate conveyor belt supporting plates underlying said conveyor belt, said separate plates dividing said continuous conveyor belt into separate support zones operatively coupled as either one set of first support zones and second support zones or a plurality of sets of first support zones and second support zones;

a group of air responsive pads in support of each of said separate plates;

controllable air flow conducting valves associated with each of said separate support zones of said conveyor belt, said valves have first positions for admitting air to said air responsive pads and second positions for exhausting air from said air responsive pads;

package detecting photocells in each of said separate zones in position to measure a preset time period in which packages fail to pass beyond said detecting means;

circuit means connecting each of said package detecting photocells in a first support zone to a valve associated with said second support zone for admitting air to said air responsive pads in a second support zone and for quickly exhausting air from said air responsive pads in the first support zone while simultaneously allowing air to slowly exhaust from said air responsive pads in a second support zone at the end of said preset time period;

a common source of air under pressure connected to each of said valves for initiating the supply of air under pressure;

air conducting circuits interconnecting said valve in said first position to supply air under pressure to said air responsive pads to support said separate plates, and said air conducting circuit means having an alternate connection with certain of said valves for exhausting air from certain of said air responsive pads to allow said conveyor belt to descend; and stationary rails adjacent said conveyor belt to catch and support packages relative to a descending conveyor belt.

5. An accumulating conveyor for moving packages comprising:

a movable conveying belt having a surface on which packages are conveyed;

a series of independent belt supporting surfaces defining a plurality of separate zones in elongated alignment;

skids extending along said separate zones of said elongated movable conveying surface, said side skids being stationary;

a source of pressure air;

air pressure pad elements connected to said source of pressure air and located in supporting positions beneath each of said separate zones of said movable conveyor to be in contact therewith for selective elevating and lowering said separate zones of said elongated movable conveying surface relative to said stationary skids;

a control system operatively connected to said air pressure elements and including package sensing means positioned in each of said separate zones of said elongated movable conveying surface, each of said sensing means having a time delay response to determine the desired continuity of package movement; through said separate zones of said elongated conveying surface; and controls responsive to said package sensing means on a leading one of said separate conveying zones detecting a package failing to move on said leading conveying zone beyond said time delay for transmitting a signal to a trailing one of said separate zones of said elongated conveying surface for initiating the lowering of said trailing one of said separate zones to transfer packages detected thereon onto said adjacent skids for interrupting package movement.

6. The combination in a package conveying system which comprises:

a) a package conveyor belt providing a continuous path for package transportation;

b) conveyor belt supporting plates arranged in alignment under said conveyor belt, said plates being separated to define separate independent zones of support under said conveyor belt for travel of said conveyor belt relative to said plates;

c) air responsive pads under each of said plates for lifting and lowering said conveyor supporting plates;

d) a source of air pressure conducted along the path of conveyor belt travel;

e) a photocell detector in each of said conveyor belt zones to respond to the passage of movement of packages on said conveyor belt; and f) a valve assembly in each of said conveyor belt zones operatively interconnecting said source of air pressure with said air responsive pads under each of said plates, said valve assembly including a first valve connected to each of said photocell detectors for lifting said plates, a second valve directing air pressure into said air responsive pads, and a third valve operatively responsive to the first valve in an adjacent conveyor belt zone for exhausting air from said air responsive pads for lowering said conveyor belt and accumulating packages on said conveyor.

7. The combination in claim 6 wherein each of said conveyor belt zones includes a protective cover hingedly connected to each zone to permit hingedly opening said protective cover to expose said valve assembly for service.

8. The combination in a package conveying system which comprises:

a) a package conveyor belt providing a continuous path for package transportation;

b) conveyor belt supporting plates arranged in alignment under said conveyor belt, said plates being separated to define separate independent zones of support under said conveyor belt for travel of said conveyor belt relative to said plates;

c) air responsive pads under each of said plates for lifting and lowering said conveyor supporting plates;

d) a source of air pressure conducted along the path of conveyor belt travel;

e) a photocell detector in each of said conveyor belt zones to respond to the passage of movement of packages on said conveyor belt; and f) a valve assembly in each conveying belt zone that responds to package non-movement in the leading zone to effect lowering said conveying belt in a trailing zone after a time interval, and responds to a combination of package non-movement in the leading zone and trailing zone by lowering said conveying belt in the trailing zone after a shorter time interval.

9. The combination in a package conveying system which comprises:

a package carrying conveyor belt providing a continuous path for the movement of packages;

conveyor belt supporting plates underlying said conveyor belt, said plates being aligned with said continuous path of said conveyor belt and defining independent zones of support for said conveyor belt;

pressure fluid responsive pads engaged under each support plate arranged in separate groups;

first fluid flow valves operatively associated with each of said separate groups of pressure fluid responsive pads;

second fluid flow valves operatively connected between said first fluid flow valves and said separate groups of pads;

a source of pressure fluid connected to each first fluid flow valve in position to supply fluid to said second fluid flow valves connected to said separate groups of fluid pressure responsive pads;

package movement detecting means on said conveyor belt arranged in said zones defined by said support plates, said detecting means responding to package travel on said conveyor belt and being responsive to package accumulation; and circuit means connected between each of said detecting means and certain of said first fluid flow valve whereby on package accumulation in a leading zone on said belt, said package detecting means in said leading zone operates to exhaust fluid from the fluid pressure responsive pads in said trailing zone, said trailing zone responding to package accumulation to withdraw support of said conveyor belt in said trailing zone for initiating accumulating packages in said trailing zone to avoid impacting packages in said leading zone.

10. The combination set forth in claim 9 wherein said package detecting means in said leading zone operates to exhaust the fluid from said group of fluid pressure responsive pads in said trailing zone to allow said belt supporting plate to lower said belt in said trailing zone.

11. The combination set forth in claim 9 wherein said conveyor belt supporting plates have a low friction surface presented to said conveyor belt.

* * * * *